(12) United States Patent
Almusallam et al.

(10) Patent No.: US 7,824,322 B2
(45) Date of Patent: Nov. 2, 2010

(54) TITANIUM PRODUCTION WASTE BYPRODUCT AS PARTIAL CEMENT REPLACEMENT

(75) Inventors: Tarek H. Almusallam, Jeddah (SA); Mohammad Iqbal Khan, Jeddah (SA); Yousef Saleh Al-Zeghayer, Jeddah (SA); Waheed Atia Al-Masry, Jeddah (SA); Fadi Mohamed Trabzuni, Jeddah (SA)

(73) Assignee: The National Titanium Dioxide, Co. Ltd. (Cristal), Jeddah (SA)

( * ) Notice: Subject to any disclaimer, the term of this patent is extended or adjusted under 35 U.S.C. 154(b) by 0 days.

(21) Appl. No.: 12/769,164

(22) Filed: Apr. 28, 2010

(65) Prior Publication Data

US 2010/0206198 A1    Aug. 19, 2010

Related U.S. Application Data

(62) Division of application No. 12/317,542, filed on Dec. 24, 2008, now Pat. No. 7,717,999.

(51) Int. Cl.
*B09B 3/00* (2006.01)

(52) U.S. Cl. .................. 588/257; 588/256; 106/713; 106/733; 264/333; 264/DIG. 43

(58) Field of Classification Search .............. 588/256, 588/257; 106/713, 733; 264/333, DIG. 43
See application file for complete search history.

(56) References Cited

U.S. PATENT DOCUMENTS

| | | | |
|---|---|---|---|
| 4,219,363 A | 8/1980 | Tokar et al. | |
| 5,562,765 A | 10/1996 | Brosnan et al. | |
| 6,328,938 B1 | 12/2001 | Taylor et al. | |
| 6,875,266 B1 | 4/2005 | Naji et al. | |
| 6,913,645 B2 | 7/2005 | McNulty, Jr. | |
| 6,936,098 B2 | 8/2005 | Ronin | |
| 7,005,007 B2 | 2/2006 | Kehrmann | |
| 7,147,706 B1 | 12/2006 | Piazza | |
| 2006/0191444 A1 | 8/2006 | Wagner | |

FOREIGN PATENT DOCUMENTS

| | | |
|---|---|---|
| KR | 555629 | 3/2006 |
| RU | 1091616 | 9/1995 |
| SU | 1099049 | 6/1984 |

(Continued)

OTHER PUBLICATIONS

Office of Solid Waste, U.S. Environmental Protection Agency, Titanium Tetrachloride Production By The Chloride Ilmenite Process, Dec. 1995, pp. 1-8.

(Continued)

*Primary Examiner*—Paul Marcantoni
(74) *Attorney, Agent, or Firm*—Kilyk & Bowersox, P.L.L.C.

(57) ABSTRACT

An industrial waste byproduct from a titanium metal or a titanium dioxide production process can be utilized as a partial cement replacement. In some embodiments, the byproduct can comprise a byproduct from the production of titanium dioxide pigment from a sulphate process or from a chloride process. The cement can be used to make concrete and other cementitious material products for structural and non-structural uses, for example, grout, mortar, gunite, stucco, masonry, decorative stonework, bricks, blocks, roof tiles, floor tiles, cobblestones, pavers, combinations thereof, and the like.

8 Claims, 3 Drawing Sheets

FOREIGN PATENT DOCUMENTS

| | | |
|---|---|---|
| SU | 1301806 | 4/1987 |
| SU | 1708796 | 1/1992 |
| WO | 84/02900 | 8/1984 |
| WO | 96/33133 | 10/1996 |

OTHER PUBLICATIONS

Sahu et al., An Overview On The Production of Pigment Grade Titania From Titania-Rich Slag, Waste Management & Research, 2006; vol. 24; pp. 74-79.

TITANIUM PRODUCTION WASTE BYPRODUCT AS PARTIAL CEMENT REPLACEMENT

CROSS-REFERENCE TO RELATED APPLICATION

This application is a divisional of U.S. patent application Ser. No. 12/317,542 filed Dec. 24, 2008, which is incorporated herein in its entirety by reference.

FIELD

The present teachings relate to cement and concrete compositions.

BACKGROUND

The present state of the art in concrete research has demonstrated the benefits of utilizing byproduct industrial waste materials as partial cement replacements. The byproduct industrial waste material, also known as mineral admixtures, such as fly ash, slag, and silica fume, can be used as partial cement replacements to change the characteristics and increase the performance of concrete. The use of byproduct material conserves energy, and has additional environmental benefits because of the reduced production and use of cement which can be associated with high carbon dioxide emissions. Byproduct materials, such as fly ash, slag, and silica fume, however, are not always readily available in all areas of the world. These materials are often imported, which increases the cost of concrete production.

In the production of titanium metal, waste byproducts are produced that are generally expensive to store and dispose of, and that are typically not useful. A need exists for an economical and environmentally friendly technique for putting such byproducts to good use.

Producing pigment grade titanium dioxide ($TiO_2$) involves chemical processes. Two processes for the manufacture of $TiO_2$ pigment are the sulphate process and the chloride process. In the sulphate process, titanium slag or ilmenite ($FeTiO_3$) is digested with strong sulphuric acid to solubilize titanium, which is later hydrolyzed and precipitated to form $TiO_2$. In the chloride process, rutile (crystalline polymorphic $TiO_2$) or high purity ilmenite is chlorinated to form gaseous titanium tetrachloride ($TiCl_4$), which is purified and oxidized to form $TiO_2$. Both processes generate large amounts of industrial waste byproducts that must be stored and disposed of properly, involving significant costs and energy use. A need exists for an economical and environmentally friendly technique for putting such byproducts to good use.

Furthermore, a need exists for economical and environmentally friendly cement replacements and methods of making concrete compositions.

SUMMARY

Features and advantages of the present teachings will become apparent from the following description. This description, which includes drawings and examples of specific embodiments, provides a broad representation of the present teachings. Various changes and modifications to the teachings will become apparent to those skilled in the art from this description and by practice of the teachings.

The present teachings relate to the use of an industrial waste material from a titanium (Ti) metal manufacturing process as a partial cement replacement, and compositions comprising cement and a byproduct of a Ti manufacturing process. The industrial waste material can comprise a byproduct of a titanium metal production process, a byproduct of $TiO_2$ produced via the chloride process, and/or a byproduct of $TiO_2$ produced via the sulphate process. According to various embodiments of the present teachings, a cementitious material is provided that can comprise cement and a byproduct of a titanium dioxide pigment production process.

Cement comprising such a Ti byproduct can be utilized, for example, in the production of concrete. In some embodiments, the result can be a lower cost of concrete production. In particular, the Ti byproduct can be utilized in place of, or in addition to, cement or other cement replacement products, such as fly ash, furnace slag, or silica fume. The Ti byproduct can comprise an industrial waste previously having no practical utility, for example, a waste byproduct that is stored or disposed of. Utilizing the Ti byproduct in cement compositions, for example, in concrete, can help to eliminate the cost of the composition, and can help to reduce the environmental impact associated with storing and disposing of the byproduct.

According to various embodiments of the present teachings, the Ti byproduct used can be a relatively soft material, or at least softer than other materials which have heretofore been used in making cement. In some embodiments, a more efficient method results because cheaper grinders can be used to process the Ti byproduct relative to grinders needed to process conventional cement or concrete filler materials.

The present teachings further relate to the use of cementitious material, for example, concrete, that includes Ti industrial waste byproduct as a partial cement replacement. According to one or more embodiments, a concrete mixture can comprise a cementitious material, aggregate, and water, wherein the cementitious material comprises a byproduct of a titanium metal or a titanium dioxide pigment production process. In some embodiments, the present teachings provide an article formed from such a mixture. The concrete can be used in a variety of products, including structural and non-structural elements. Utilizing Ti byproduct in concrete can result in lower material costs compared to, for example, the costs involved with using pozzolanic materials such as fly ash, and can minimize or eliminate costs associated with industrial waste storage. The use of Ti byproduct materials reduces the amount of cement production, therefore conserving energy and resulting in less carbon dioxide emission in the environment.

The present teachings also relate to methods of producing concrete that comprises Ti industrial byproduct as a partial cement replacement. According to various embodiments, a method of producing a concrete mixture can comprise mixing a byproduct of a titanium metal or titanium dioxide pigment production process, with cement, to produce a cementitious material, and mixing the cementitious material with an aggregate and water. In some embodiments, the byproduct can be combined with aggregate and/or water before contacting or mixing with the cement. In some embodiments, a wet mixture comprising cement, the Ti byproduct, and water, is provided, or a hardened article made from hardening such a wet mixture.

The present teachings further relate to a hardened concrete product that includes Ti industrial byproduct as a partial cement replacement. According to one or more embodiments, a hardened concrete product can comprise a cementitious material, aggregate, water, and a byproduct of a titanium metal or titanium dioxide pigment production process. The hardened concrete product can comprise, for example, a brick, a block, a tile, or a combination thereof.

BRIEF DESCRIPTION OF THE DRAWINGS

The accompanying drawings, which are incorporated into and constitute a part of the specification, illustrate specific embodiments of the invention, and taken in conjunction with the detailed description of the specific embodiments, serve to explain the principles of the invention.

DETAILED DESCRIPTION

Figure 1:
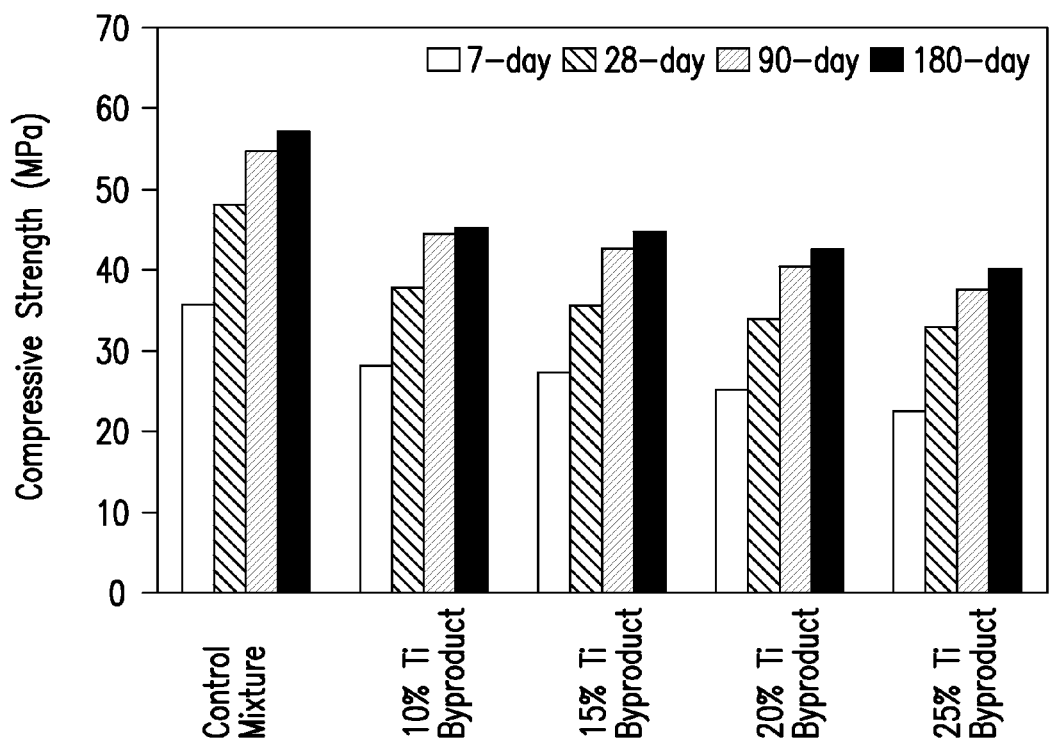
FIG. 1 is a bar graph showing compressive strength development over time of various embodiments of concrete mixtures, compared to a control mixture of identified composition but with 0% of the Ti byproduct.

The following detailed description serves to explain the principles of the present teachings. The present teachings are susceptible to modifications and alternative forms and are not limited to the particular forms disclosed herein. The present teachings cover modifications, equivalents, and alternatives.

According to various embodiments, a cementitious material can comprise cement and a byproduct resulting from the production of titanium metal (Ti), or titanium dioxide ($TiO_2$), for example, $TiO_2$ pigment. The Ti byproduct can comprise a $TiO_2$ byproduct produced, for example, via the chloride process of pigment production, and which is typically classified as an industrial solid waste product having no utility or practical value. Other methods of Ti and $TiO_2$ production can also result in the production of byproduct, for example, the method known as the sulfate process. In an exemplary embodiment, a process that was used by the National Titanium Dioxide Company, Ltd. (Yanbu Al-Sinaiyah, Saudi Arabia) produced a Ti byproduct during a production run of titanium dioxide pigment via the chloride process. Chemical analysis results of the exemplary Ti byproduct are shown in Table 1.

TABLE 1

Chemical analysis of Ti byproduct

| Component | Percent |
|---|---|
| $SiO_2$ | 3.10 |
| $Al_2O_3$ | 1.83 |
| $Fe_2O_3$ | 19.80 |
| CaO | 29.92 |
| MgO | 3.62 |
| $SO_3$ | 5.16 |
| MnO | 3.41 |
| Inert Materials | 33.16 |

The inert materials of the byproduct analyzed in Table 1 can comprise compounds that do not have a significant effect on the properties of the concrete. In some embodiments, although the percentages by weight can vary, the Ti byproduct can comprise one or more of $SiO_2$, $Al_2O_3$, $Fe_2O_3$, CaO, MgO, $SO_3$, MnO, and any combination thereof.

The Ti byproduct can comprise a solid powder and can be produced in pelleted form for handling, transportation, and/or storage purposes. The Ti byproduct pellets can be powdered using a suitable grinder. The Ti byproduct can be a "soft" material such that the grinder that can be used can be cheaper and/or can last longer than grinders used to grind harder materials used in making cement. According to various embodiments, the Ti byproduct can be powdered to have desired physical properties such as grain size, fineness, and specific gravity. For example, an exemplary Ti byproduct that can be used can have the physical properties reported in Table 2.

TABLE 2

Physical properties of Ti byproduct

| Property | Value |
|---|---|
| Fineness - Blaine ($cm^2/g$) | 4232 |
| Specific gravity | 2.32 |
| Color | Grey |
| Shape | Angular pellet form |

As shown in Table 2, the fineness of Ti byproduct powder can be determined, for example, using a Blaine's air permeability apparatus, as per test ASTM C204, and expressed in terms of the specific surface, such as total surface area in square centimeters per gram of powder ($cm^2/g$). According to various embodiments, the Ti byproduct powder can have an average specific surface, as per test ASTM C204, of from about 2000 $cm^2/g$ to about 6000 $cm^2/g$, of from about 3000 $cm^2/g$ to about 5000 $cm^2/g$, of from about 4000 $cm^2/g$ to about 4500 $cm^2/g$, or of about 4200 $cm^2/g$. According to various embodiments, the Ti byproduct powder can have an average specific gravity of from about 1.5 to about 3, of from about 2 to about 2.5, of from about 2.2 to about 2.4, or of about 2.3.

The Ti byproduct can be utilized in the cementitious material in any desired amount or range of amounts. According to various embodiments, the cementitious material can comprise Ti byproduct present in a range of from about one percent to more than sixty percent by weight based on the total weight of the cementitious material. In various embodiments, the cementitious material can comprise at least five percent, at least 10 percent, at least 15 percent, at least 20 percent, at least 25 percent, at least 30 percent, at least 40 percent, at least 50 percent, or more than 50 percent, by weight, Ti byproduct based on the total weight of the cementitious material.

The cementitious material can further comprise one or more additional material. According to various embodiments, the additional material can comprise, for example, a mineral admixture such as fly ash, slag, and silica fume. The additional material can be provided as a partial cement replacement, or to change the performance and/or characteristics of the cement. The additional material can comprise, for example, an inorganic additive, an organic additive, or a combination thereof.

According to one or more embodiment, the cement can comprise any type of cement, for example, any type of Portland cement (for example, Type I, Type II, Type III, Type IV, Type V, as recognized by test ASTM C150), any type of hydraulic cement (for example, Type GU, Type HE, Type MS, Type HS, Type MH, Type LH, as recognized by test ASTM C1157), any type of blended cement (for example, Type IS, Type IP, as recognized by test ASTM 595), or a combination thereof. A typical Portland cement that can be used can comprise, for example, tricalcium silicate, $(CaO)_3.SiO2$ (45-75%); calcium oxide, CaO (61-67%); dicalcium silicate, $(CaO)_2.SiO2$ (7-32%); silicon oxide, SiO2 (19-23%); tricalcium aluminate, $(CaO)3.Al2O3$ (0-13%); aluminum oxide, $Al_2O_3$ (2.5-6%); tetracalcium aluminoferrite, $(CaO)_4.Al_2O_3.Fe_2O_3$ (0-18%); ferric oxide, $Fe_2O_3$ (0-6%); and gypsum, $CaSO_4.2H_2O$ (2-10%).

According to various embodiments, a concrete mixture is provided that comprises a cementitious material, aggregate, and water, wherein the cementitious material comprises a Ti byproduct comprising a byproduct of a titanium dioxide pigment production process. The byproduct can comprise, for example, the Ti byproduct described above and analyzed in Table 1, which has been produced during the manufacture of titanium dioxide via the chloride production process.

The concrete mixture can comprise any desirable amount of cementitious material. According to various embodiments, the concrete mix can comprise from about 1 percent to about 50, from about 5 percent to about 30 percent, from about 10 percent to about 20 percent, or about 15 percent, by weight, of the cementitious material based on the total weight of the concrete mixture. The cementitious material can comprise a Ti byproduct in a range, for example, of from about one percent to more than fifty percent by weight based on the weight of the cementitious material. The cementitious material can comprise at least five percent, at least 10 percent, at least 15 percent, at least 20 percent, at least 25 percent, at least 30 percent, at least 40 percent, at least 50 percent, or more than 50 percent Ti byproduct, by weight, based on the total weight of the cementitious material.

The concrete mixture can comprise any desirable amount of aggregate, and the aggregate can comprise any desirable amount of coarse aggregate, fine aggregate, or any combination thereof. The total aggregate can comprise from about 50 percent to about 90 percent, from about 60 percent to about 85 percent, from about 70 percent to about 80 percent, or about 77 percent, by weight, based on the total weight of the concrete mixture.

If a coarse aggregate is used, it can comprise, for example, gravel or stone, and can be, for example, from about 5 mm to about 40 mm in average diameter. The coarse aggregate can comprise one or more different sizes, for example, a mixture of gravel of about 10 mm and gravel of about 20 mm, average diameters. Any desirable amount and ratio of coarse aggregate can be utilized. In some embodiments, for example, the coarse aggregate can comprise about 80 percent 20 mm gravel, and about 20 percent 10 mm gravel, by weight, based on the total weight of coarse aggregate in the concrete mixture.

If a fine aggregate is used, it can comprise, for example, crushed stone, crushed sand, washed sand, silica sand, or any combination thereof. Any desirable amount and ratio of fine aggregate can be utilized. In some embodiments, for example, a fine aggregate can be used that can comprise about 60 percent silica sand and about 40 percent crushed sand, by weight, based on the total weight of fine aggregate in the concrete mixture.

The total aggregate can comprise any desirable amount and ratio of coarse aggregate and fine aggregate. In some embodiments, the coarse aggregate can comprise, for example, from about 0 percent to about 100 percent, from about 40 percent to about 80 percent, from about 50 percent to about 70 percent, or about 60 percent, by weight, based on the total weight of all aggregate in the concrete mixture. In some embodiments, the coarse aggregate can comprise from about 40% to about 50%, or about 44%, by weight, based on the total weight of the concrete mixture. In some embodiments, the fine aggregate can comprise, for example, 0 percent to about 100 percent, from about 20 percent to about 60 percent, from about 30 percent to about 50 percent, or about 40 percent, by weight, based on the total weight of all aggregate in the concrete mixture. In some embodiments, the fine aggregate can comprise from about 25% to about 40%, or about 33%, by weight, based on the total weight of the concrete mixture. According to various embodiments, the total weight of fine aggregate can comprise about 60 percent by weight silica sand and about 40 percent by weight crushed sand, the total weight of coarse aggregate can comprise about 80 percent by weight 20 mm gravel and about 20 percent by weight 10 mm gravel, and the concrete mixture can meet ASTM C33 grading limits.

With respect to ratios of aggregate to cement, in some embodiments the ratio of total aggregate to cement can be from about 1 to about 10, from about 4 to about 6, from about 5 to about 5.5, or about 5.23 (i.e., 5.23:1). In some embodiments, the ratio of coarse aggregate to cement can be from about 1 to about 5, from about 2 to about 4, or about 3.00 (i.e., 3.00:1). In some embodiments, the ratio of fine aggregate to cement can be from about 1 to about 4, from about 2 to about 2.5, or about 2.23 (i.e., 2.23:1).

Coarse and fine aggregates can be obtained, for example, from a ready mix company. The physical properties of exemplary coarse and fine aggregates are presented in Table 3. The properties reported in Table 3 were measured in accordance with test ASTM C127 and test ASTM C128.

TABLE 3

Physical properties of aggregates

| Material | Dry-rodded Unit Weight, $kg/m^3$ | Bulk specific gravity | | | Absorption, % by weight |
|---|---|---|---|---|---|
| | | Apparent specific gravity | Oven dry | Saturated surface dry | |
| Wash sand | 1644 | 2.66 | 2.54 | 2.59 | 1.76 |
| Silica sand | 1774 | 2.67 | 2.66 | 2.66 | 0.24 |
| 10 mm agg. | 1592 | 2.68 | 2.61 | 2.63 | 1.03 |
| 20 mm agg. | 1566 | 2.67 | 2.58 | 2.61 | 1.17 |

The concrete mixture can comprise any desirable amount of water. The water can comprise, for example, from about 2 percent to about 20 percent, from about 4 percent to about 15 percent, from about 6 percent to about 10 percent, or about 8 percent, by weight, based on the total weight of the wet, non-dried, concrete mixture.

In some embodiments, the ratio of water to cement or water to cementitious material can be from about 0.4 to about 0.7, from about 0.5 to 0.6, or about 0.55 (i.e., 0.55:1).

According to various embodiments, concrete can be produced that includes a Ti byproduct. A method of producing a concrete mixture can comprise mixing a Ti byproduct comprising a byproduct of a titanium dioxide pigment production process, with cement, to produce a cementitious material, and mixing the cementitious material with an aggregate and water. The mixing steps can be performed in a drum mixer, for example, in accordance with the method described in ASTM C192. The Ti byproduct, cement, aggregate, and water can be mixed together in any desired order, for example, the Ti can be premixed with the cement prior to mixing with the aggregate and the water. Raw Ti byproduct often exists in pellet form, thus, the method can comprise subjecting the Ti byproduct to a grinding step, prior to mixing with the cement and/or one or more other components of the mixture.

The method can include a hardening step. According to various embodiments, the method can further comprise inducing a hardening reaction of the concrete mixture, for example, and recovering a hardened product. The concrete mixture can be shaped into any desired shape or article prior to, or during, the hardening reaction. In one or more embodiments, the hardened product can have a compressive strength, as per test ASTM C618, in a range of from about 30 megapascals (MPa) to about 40 MPa, when measured 28 days after inducing a hardening reaction.

According to various embodiments, a hardened concrete product is provided that can comprise a Ti byproduct. A hardened concrete product can comprise a cementitious material, an aggregate, water, and a Ti byproduct comprising a byproduct of a titanium dioxide production process. In various embodiments, the hardened concrete product can have a compressive strength, as per test ASTM C618, of from about 30 MPa to about 40 MPa, when measured after 28 days. The hardened concrete product can be useful for structural and non-structural uses. The intended uses can depend on the strength properties, and can further depend on the amount of Ti byproduct in the hardened product. The hardened concrete product can be used, for example, to make grout, mortar, gunite, stucco, masonry, decorative stonework, bricks, blocks, roof tiles, floor tiles, cobblestones, pavers, and combinations thereof.

Example 1

Mix Proportions

A concrete mixture was prepared for investigation. The concrete mixture composition used in this example is summarized in Table 4 below.

TABLE 4

Mix proportions of components of concrete

| Materials | Quantities, kg/m³ |
|---|---|
| Total Cementitious Material | 350 |
| 20 mm aggregate | 840 |
| 10 mm aggregate | 210 |
| Washed sand | 310 |
| Silica sand | 470 |
| Free water | 192.5 |

As can be seen, the ratio of water to total cementitious material is 0.55.

Properties of Aggregates

Fine and coarse aggregates were obtained from a local ready mix company. The physical properties of the fine and coarse aggregates used were determined in accordance with tests ASTM C127 and ASTM C128, and are presented in Table 3 above. In order to meet the ASTM C33 grading limits, 60 percent by weight silica sand and 40 percent by weight crushed sand were used as fine aggregate, and 80 percent by weight 20 mm gravel and 20 percent by weight 10 mm gravel were used as coarse aggregate.

Preparation of Test Specimens

Mixing was conducted in a revolving drum mixer in accordance with protocol ASTM C192. In order to maintain the uniformity in mixing and proper dispersion, the Ti byproduct was pre-mixed with cement prior to mixing using the concrete mixer. Concrete cubes of 150 mm were cast in rigid plastic moulds for the compressive strength study. The molds were filled in two equal layers and each layer was compacted by external vibration. The molds were tapped by a rubber hammer for removal of any entrapped air and the surface was smoothed and leveled by a trowel. The specimens were covered with plastic covers to stop the evaporation and stored in a controlled laboratory environment (23° C., 30% RH) for the first 24 hours followed by demolding. Then, the specimens were cured in lime saturated water tanks at 22° C.±2° C. until the desired testing age.

Temperature of Mixing

In order to control the temperature at the time of mixing, mixing was conducted in a controlled laboratory environment. The temperature during the mixing was kept within the range of 20° C.±2° C. The concrete temperature was recorded for all mixes and was determined to be 24° C.±2° C.

Slump

The initial slump of all mixes was measured in accordance with protocol ASTM C143, and is reported in Table 5 below.

Setting Time

Setting of a cement paste or a concrete mixture as discussed herein refers to a change from a fluid state to a rigid state. During setting, the temperature of the concrete mixture changed. The initial set was accompanied by a rapid rise in temperature, and the final set corresponded to a temperature peak. The initial and final setting times for the concrete mixtures with and without Ti byproduct were measured. Setting times were measured in accordance with protocol ASTM C1202. The protocol was performed on the mortar fraction sieved from fresh concrete mixture through a standard ASTM # 4 Sieve. During the standing time, the mortar specimens were covered to minimize water loss through evaporation. The results are shown in Table 5.

TABLE 5

Initial slump and setting times of concrete containing Ti byproduct

| Mixture | Initial Slump (mm) | Setting Times (Hrs) | |
|---|---|---|---|
| | | Initial Setting | Final Setting |
| Control mixture (100% cement) | 90 | 4.20 | 6.25 |
| 10% Ti byproduct (90% cement + 10% Ti byproduct) | 90 | 4.00 | 5.84 |
| 15% Ti byproduct (85% cement + 15% Ti byproduct) | 90 | 3.65 | 5.42 |
| 20% Ti byproduct (80% cement + 20% Ti byproduct) | 80 | 3.44 | 4.96 |
| 25% Ti byproduct (75% cement + 25% Ti byproduct) | 70 | 3.47 | 5.00 |
| 30% Ti byproduct (70% cement + 30% Ti byproduct) | 65 | 3.25 | 4.67 |

The concrete mixtures containing 10% and 15% Ti byproduct and the control mixture showed similar initial slumps of 90 mm. Concrete mixtures containing 20%, 25%, and 30% Ti byproduct showed initial slumps of 80 mm, 70 mm, and 65 mm, respectively. It was concluded that the incorporation of Ti byproduct in amounts of up to 15% (by weight) has no effect on the slump, while concrete mixtures containing 20% or more Ti byproduct exhibited a reduced slump when compared to the control mixture.

The initial setting time of the concrete mixture containing 10% Ti byproduct, and that of the control mixture were similar. The concrete mixtures containing 15% Ti byproduct or more showed slightly lower setting time values. The concrete mixtures containing Ti byproduct had a reduced final setting time that decreased almost linearly with the increase in the amount of Ti byproduct incorporated. Concrete mixtures containing 20% to 30% Ti byproduct did not show much variation in final setting times.

Compressive Strength Development

Compressive strength development was measured according to test BS1881. Compressive strength was measured on concrete products containing 0%, 10%, 15%, 20%, and 25% Ti byproduct having the composition shown in Table 1 above, at 7, 28, 90, and 180 days. The results of strength development are presented in Table 6 and are shown in FIG. 1.

TABLE 6

Compressive strength development of Ti byproduct concrete

| Mixture | Compressive Strength (MPa) | | | |
|---|---|---|---|---|
| | 7-day | 28-day | 90-day | 180-day |
| Control mixture (100% cement) | 35.7 | 48.1 | 54.7 | 57.3 |
| 10% Ti byproduct (90% cement + 10% Ti byproduct) | 28.2 | 37.7 | 44.4 | 45.3 |
| 15% Ti byproduct (85% cement + 15% Ti byproduct) | 27.4 | 35.6 | 42.8 | 48.0 |
| 20% Ti byproduct (80% cement + 20% Ti byproduct) | 25.1 | 34.2 | 40.4 | 42.7 |
| 25% Ti byproduct (75% cement + 25% Ti byproduct) | 22.3 | 33.0 | 37.6 | 40.2 |

Compressive strength of concrete decreased with an increase in Ti byproduct replacement level. The compressive strength decrease in the mix containing 10% Ti byproduct was not significant compared to that of the mixture containing 15% Ti byproduct, at all ages investigated.

Figure 2:
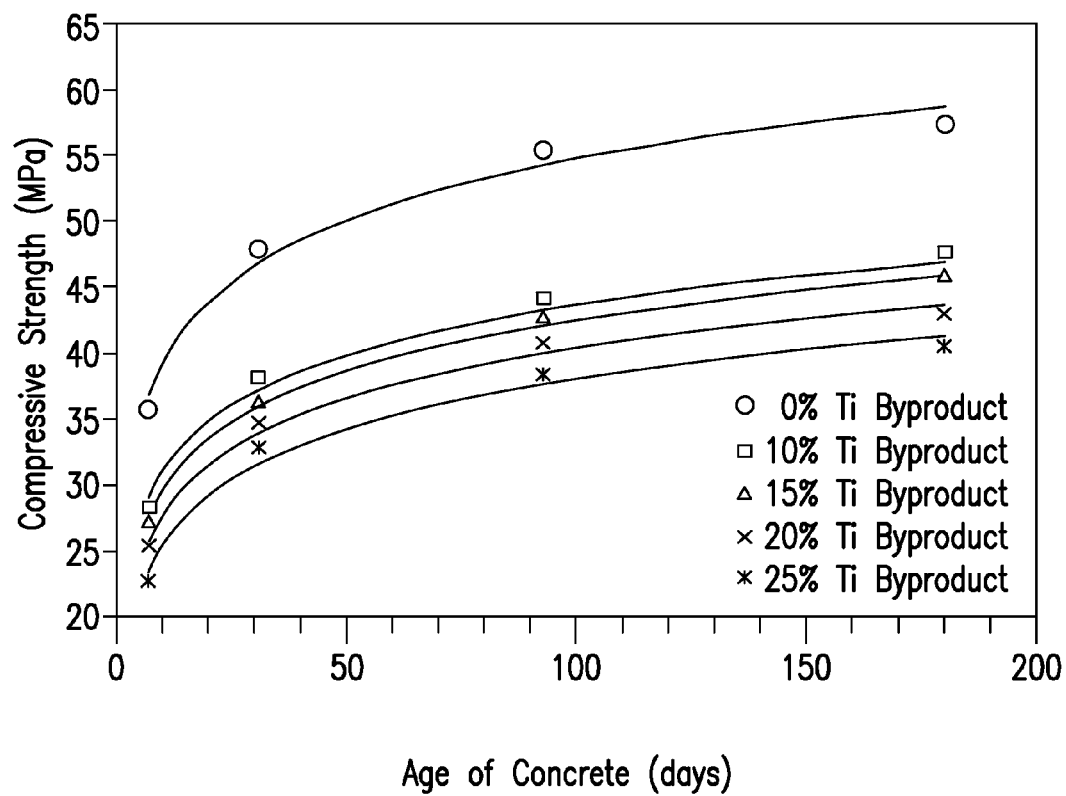
FIG. 2 is a graph showing the variation of compressive strength versus age of various embodiments of concrete mixtures according to the present teachings, and the variation of a control mixture.

As shown in the graph in FIG. 2, at 28 and 90 days, the strength pattern remained similar to that at 7 days, however, the rate of gain increased. The rate of increase in compressive strength of Ti byproduct mixtures was similar to the control mixture at all ages investigated. All concrete mixtures containing Ti byproduct showed lower compressive strength than the control mixture, however, the compressive strength development of these Ti byproduct mixtures did not decrease drastically.

For the concrete containing the admixture, it was normal that strength development was delayed at early ages due to a delay in the hydration process. The hydration reaction was responsible for the development of strength. Due to the delayed hydration reaction, the strength development of concrete containing admixture emerged at later ages, as expected.

The results of compressive strength tests confirmed the utilization of Ti byproduct as partial cement replacement for the production of concrete. Based on the results obtained, it can be concluded that the mixtures containing Ti byproduct up to about 20% by weight, as a partial cement replacement, based on the total weight of the concrete mixture, can be recommended for normal strength concrete elements requiring a compressive strength of 35 MPa at 28 days.

Figure 3:
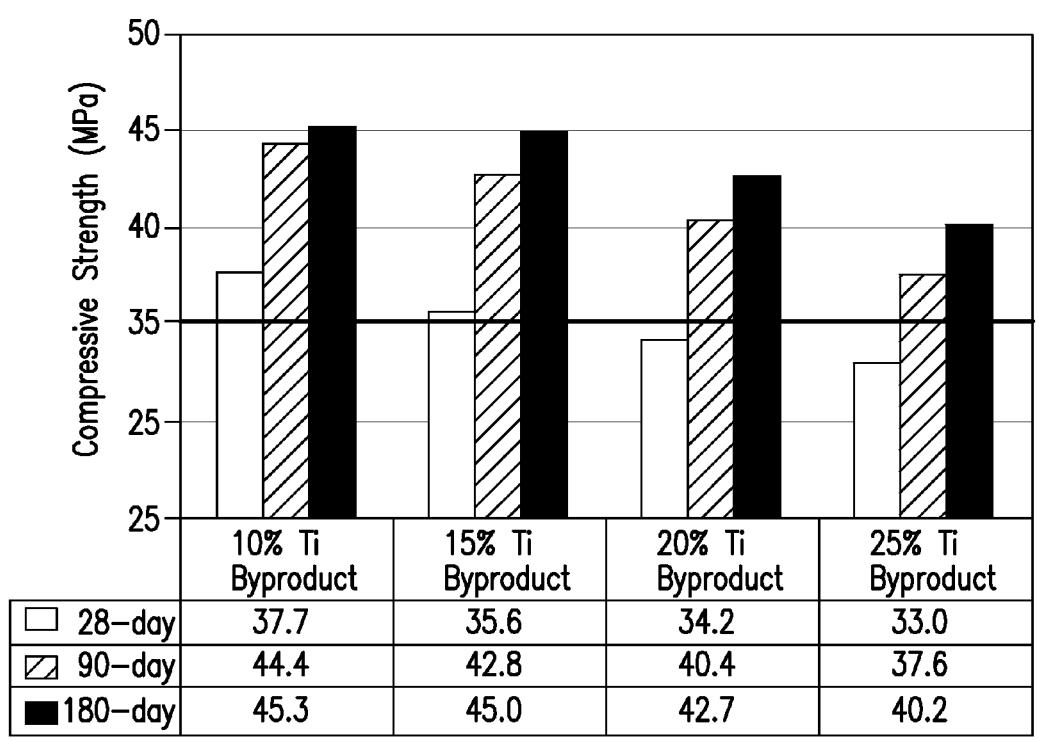
FIG. 3 is a bar graph showing the compressive strength of various embodiments of concrete mixtures compared to a threshold 35 MPa compressive strength as used in construction practice.

In construction practice, the required compressive strength of normal concrete needed is about 30 MPa to 35 MPa at 28 days. The data represented in FIG. 3 shows the variation in compressive strength of various mixtures including many according to the present teachings. In FIG. 3, a horizontal line is drawn at the 35 MPa value so that mixtures exhibiting compressive strengths above this line can be identified easily. It can be seen that the compressive strength of concrete mixtures containing 10%, 15%, and 20% Ti byproduct achieve at least 35 MPa at 28 days, while mixtures containing 25% Ti byproduct showed slightly lower strength than 35 MPa. Therefore, mixtures containing Ti byproduct up to 20% can be recommended for normal strength concrete elements.

The strength activity index test was conducted at the ages of 7 days and 28 days in accordance with ASTM C311 and ASTM C618 requirements. The ASTM requirement for strength index of cementitious/pozzolanic material is that mortar prepared in accordance with the ASTM procedure must have at least 75% (0.75) of the compressive strength of the control mixture at 7 days and at 28 days. In this investigation, mortar mixtures of control mixture (100% cement) and Ti byproduct mortar mix (80% cement: 20% Ti byproduct, by weight) were prepared in accordance with ASTM C311 specifications. The compressive strength results obtained at 7 days and at 28 days are presented in Table 7.

TABLE 7

Strength Activity Index in accordance with ASTM specifications

| Mixture | Compressive Strength (MPa) | |
|---|---|---|
| | 7-day | 28-day |
| Control mixture (100% cement) | 38.9 | 48.7 |
| Ti byproduct mixture (80% cement + 20% Ti byproduct) | 29.0 | 34.8 |

As indicated in Table 7, the 7-day and 28-day compressive strengths of the 20% Ti byproduct mixture is about 75% and 72%, respectively, that of the control mixture. These results demonstrate that the 7-day strength complies with the specification of test ASTM C618, whereas the 28-day strength value is slightly (3%) lower than that required by ASTM C618. This slight reduction, however, is not significant, and mixtures containing up to 20% Ti byproduct can be suitable for normal strength (35 MPa) concrete elements. The mixtures containing 25% and 30% Ti byproduct can also be useful for concrete products where compressive strength of such levels is not required.

While the present teachings have been described in terms of exemplary embodiments, it is to be understood that changes and modifications can be made without departing from the present teachings.

What is claimed is:

1. An article comprising a hardened form of a concrete mixture, the concrete mixture comprising:
    a cementitious material comprising cement and a byproduct of at least one of a titanium metal and a titanium dioxide production process;
    aggregate; and
    water.

2. A method of producing a concrete mixture, comprising:
    mixing together a byproduct of at least one of a titanium metal and a titanium dioxide production process, with cement, an aggregate, and water.

3. The method of claim 2, further comprising grinding the byproduct prior to the mixing.

4. The method of claim 2, wherein the mixing is performed in a drum mixer in accordance with ASTM C192.

5. The method of claim 2, wherein the aggregate comprises gravel and sand.

6. The method of claim 2, wherein the byproduct is mixed with the cement to form a cementitious material prior to mixing with the aggregate and the water.

7. The method of claim 6, wherein the byproduct comprises from about 10 percent by weight to about 30 percent by weight based on the total weight of the cementitious material.

8. The method of claim 2, further comprising:
    hardening the concrete mixture to form a hardened product; and
    recovering the hardened product.

* * * * *